United States Patent
Gandiga

(10) Patent No.: US 10,598,502 B2
(45) Date of Patent: Mar. 24, 2020

(54) ROUTING FOLLOWING VEHICLES TOWARD A LEAD VEHICLE IN A VEHICLE CARAVAN

(71) Applicant: Ford Global Technologies, LLC, Dearborn, MI (US)

(72) Inventor: Sandeep Raj Gandiga, Santa Clara, CA (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 15/999,438

(22) Filed: Aug. 20, 2018

(65) Prior Publication Data

US 2020/0056899 A1 Feb. 20, 2020

(51) Int. Cl.
| G05D 1/00 | (2006.01) |
| G01C 21/34 | (2006.01) |
| G01S 19/03 | (2010.01) |
| G01S 19/51 | (2010.01) |
| G01C 21/36 | (2006.01) |

(52) U.S. Cl.
CPC ..... *G01C 21/3438* (2013.01); *G01C 21/3626* (2013.01); *G01S 19/03* (2013.01); *G01S 19/51* (2013.01)

(58) Field of Classification Search
CPC .. G05D 1/0027; G05D 1/0295; G05D 1/0287; G01C 21/3415; G01C 21/26; G08G 1/22; G08G 1/161; G08G 1/20
USPC ........................... 701/300, 400, 532; 340/902
See application file for complete search history.

(56) References Cited

U.S. PATENT DOCUMENTS

| 7,363,117 B2 | 4/2008 | Tengler et al. |
| 9,026,367 B2 | 5/2015 | Paek et al. |
| 9,125,020 B2 | 9/2015 | Banasky, Jr. et al. |
| 9,310,213 B2 | 4/2016 | Dave et al. |
| 9,817,404 B1* | 11/2017 | Loo ............................ G08G 1/22 |
| 9,829,326 B2 | 11/2017 | Pühler et al. |
| 2014/0302774 A1 | 10/2014 | Burke et al. |
| 2015/0192420 A1* | 7/2015 | Watters .............. G01C 21/3407 |
| | | 701/410 |

FOREIGN PATENT DOCUMENTS

DE 102014209198 A1 11/2015

* cited by examiner

*Primary Examiner* — Dalena Tran
(74) *Attorney, Agent, or Firm* — Brandon Hicks; Eversheds Sutherland (US) LLP

(57) ABSTRACT

The present disclosure extends to methods, systems, and computer program products for routing following vehicles toward a lead vehicle in a vehicle caravan. GPS locations can be shared between caravanning vehicles moving towards a destination. Routes (e.g., turn-by-turn navigation) for individual vehicles participating in a caravan can be dynamically updated. Within a group of GPS devices, one GPS device (e.g., a GPS device at a designated lead vehicle) can be selected as a master GPS device. As the designated lead vehicle travels towards the destination, the master GPS device can continually share its GPS coordinates (i.e., share its location) with the other GPS devices. The other GPS devices use the shared GPS coordinates to continually adjust routes to progress towards the master GPS device (and thus progress towards the lead vehicle). That is, the other GPS devices are continually updating navigation routes to follow the master GPS device.

17 Claims, 7 Drawing Sheets

ROUTING FOLLOWING VEHICLES TOWARD A LEAD VEHICLE IN A VEHICLE CARAVAN

FIELD

This disclosure relates generally to the field of motor vehicle navigation, and, more particularly, to routing following vehicles toward a lead vehicle in a caravan of vehicles traveling to a destination.

BACKGROUND

Navigation systems are useful for providing turn-by-turn directions to a specific destination. Thus, if several vehicles enter the same destination, corresponding navigation systems can provide turn-by-turn directions for each vehicle to travel to the destination. In addition to reaching a destination, drivers of a group of vehicles may desire to caravan to a destination. When caravanning, the goal is for the group of vehicles to stay together and travel essentially the same path to the destination. Typically, a lead vehicle is selected. One or more follower vehicles attempt to keep the lead vehicle within visual sight and follow the lead vehicle to the destination.

However, due to traffic conditions, unplanned stops, traffic control devices, etc. one or more follower vehicles may get separated from (e.g., lose sight of) the lead vehicle in transit to the destination. When these situations arise, occupants of the various vehicles may use other communication mechanisms (e.g., mobile phones) to discuss and agree on how to regroup. Using other communication mechanisms when a vehicle is travelling can be difficult and inconvenient for vehicle occupants. For example, if a person is driving alone, it may not be safe to talk on the phone. Further, as the number of follower vehicles increases the complexity of coordinating route changes also increases. For example, it might take multiple calls between occupants of the lead vehicle and various follower vehicles to communicate route changes to everyone.

BRIEF DESCRIPTION OF THE DRAWINGS

The specific features, aspects and advantages of the present disclosure will become better understood with regard to the following description and accompanying drawings where.

DETAILED DESCRIPTION

Figure 1:
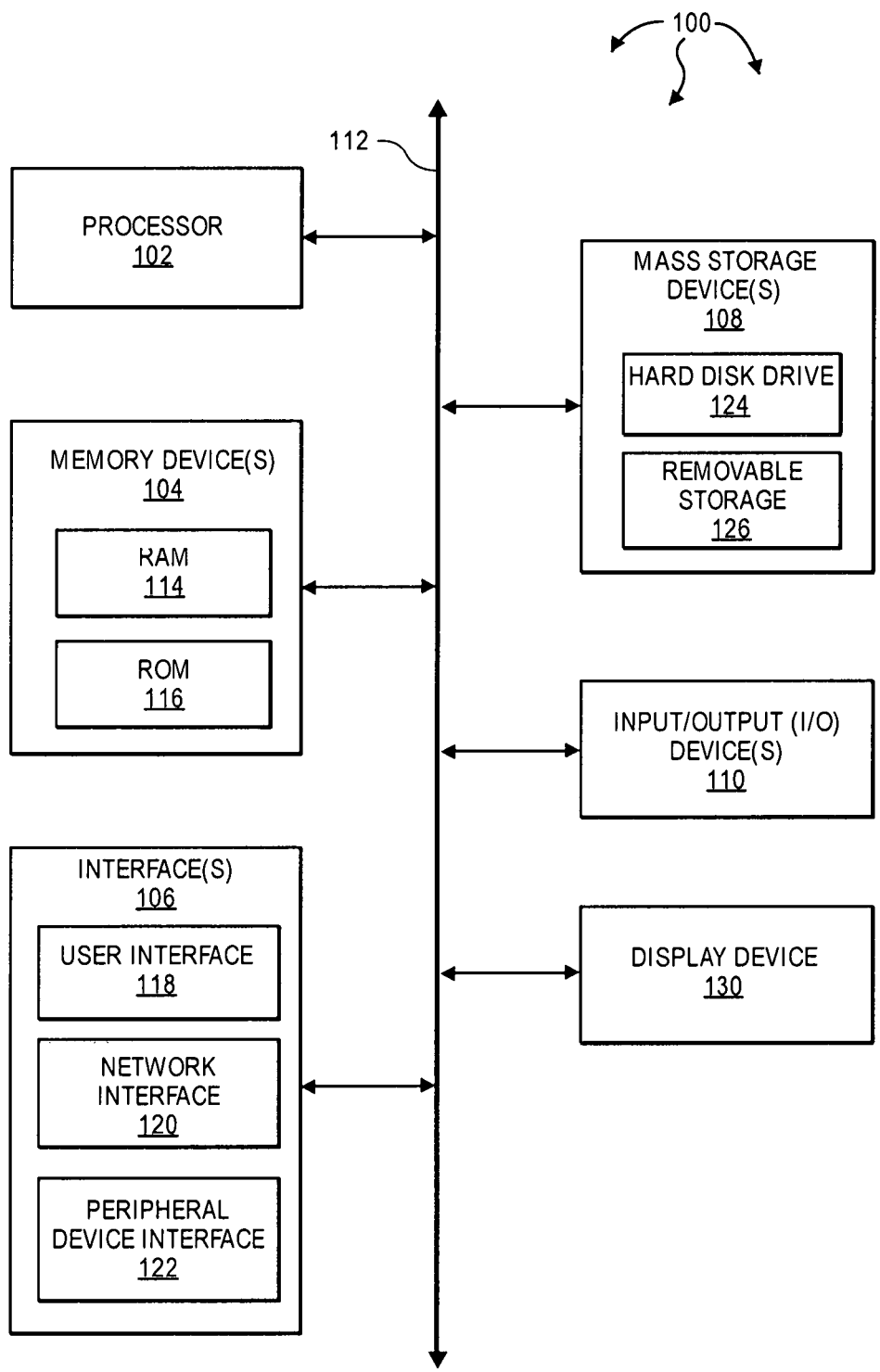
FIG. 1 illustrates an example block diagram of a computing device.

The present disclosure extends to methods, systems, and computer program products for routing following vehicles toward a lead vehicle in a vehicle caravan.

On the road, it may be that occupants of multiple vehicles intend to stay together to travel (or "caravan") to a destination. One vehicle can be selected as a lead vehicle and one or more follower vehicles can attempt to follow the lead vehicle to the destination. Various Global Positioning System (GPS) devices, including car infotainment systems, Global Positioning System (GPS) navigation devices, mobile phones, etc. include maps with GPS and can provide directions to a destination on a map. Thus, to plan a trip, an occupant in each caravanning vehicle can set a common destination in a GPS device and individually follow the route on the GPS device.

Since there can be multiple routes to a destination, a GPS device may or may not consider traffic, tolls, short cuts, more convenient places to stop, detours, vista points, etc. Further, GPS devices in different vehicles may use different preferences to prioritize routes having different characteristics (shortest distance, least time, no interstate, etc.). Thus, even if the same destination is selected among caravanning vehicles, different GPS devices may compute different routes to the destination. If different vehicles follow different routes, vehicles can go out of sync with (e.g., not follow, lose sight of, etc.) one another.

Further, even if caravanning vehicles start from the same location and are trying to follow the same route to a common destination, traffic conditions, unplanned stops, traffic control devices, etc. can also cause vehicles to go out of sync with one another. When using individual GPS devices, it can be difficult for vehicles to catch up to one another or resync. It may be possible for an occupant of one vehicle to share a GPS location from his or her map application with a map application of an occupant in another vehicle. However, sharing GPS locations between map applications is a static, manual process.

Accordingly, aspects of the disclosure include mechanisms to better keep caravanning vehicles in sync. GPS locations can be automatically shared between caravanning vehicles and routes (e.g., turn-by-turn navigation) can be dynamically updated at individual vehicles participating in a caravan.

GPS devices at a plurality of vehicles formulate GPS coordinates from GPS satellite signals based on current position and even when moving. Each GPS device can include a user interface to search for other GPS devices (e.g., at other vehicles) and group with the other GPS devices. Alternately, GPS devices auto-recognize the location of one another and form a group automatically. GPS devices can communicate with one another directly via an ad hoc network (e.g., Vehicle-to-Vehicle (V2V)) and/or can communicate through a cloud based service (e.g., Vehicle-to-Infrastructure (V2I)). For example, a common cloud service can facilitate auto discovery of friends.

Within a group of GPS devices, one GPS device (e.g., a GPS device at a designated lead vehicle) can be selected as a master GPS device. The master GPS device can continually share its GPS coordinates (i.e., share its location) with the other GPS devices. GPS coordinate sharing can include direct communication with other GPS devices (e.g., V2V) and/or communication with a cloud based service (e.g., V2I).

Other (following) GPS devices (e.g., at following vehicles) can continually receive/access GPS coordinates shared from the master GPS device. GPS coordinates can be received/accessed via direct communication (e.g., V2V) and/or via communication with the cloud based service (e.g., V2I). The other GPS devices use the shared GPS coordinates to continually adjust routes to progress towards the master GPS device (and thus progress towards the lead vehicle). That is, the other GPS devices are continually updating navigation routes to follow the master GPS device.

In one aspect, GPS coordinates are shared (e.g., by a lead vehicle) at a specified sharing frequency (e.g., once per second). In another aspect, a sharing frequency of sharing GPS coordinates is adjustable and can change during a trip based on vehicle configurations, such as, vehicle speeds, distances between vehicles, etc. For example, a lead vehicle can share GPS less frequently when vehicles are moving at slower speeds and/or when vehicles are separated by greater distances. On the hand, a lead vehicle can share GPS coordinates more frequently when vehicles are moving at faster speeds and/or when vehicles are separated by smaller distances.

A lead vehicle can share GPS coordinates at essentially any frequency. In one aspect, a lead vehicle shares GPS coordinates at a sharing frequency between 1 GPS coordinate per second and 1 GPS coordinate per 30 seconds. In another aspect, a lead vehicle shares GPS coordinates at a sharing frequency between 1 GPS coordinate per 0.5 seconds (i.e., 2 GPS coordinates per second) and 1 GPS coordinate per 10 seconds. In a further aspect, a lead vehicle shares GPS coordinates at a sharing frequency in a range between 1 GPS coordinate per 0.25 seconds (i.e., 4 GPS coordinates per second) and 1 GPS coordinate per 5 seconds.

In one aspect, an occupant in a following vehicle can request a change to GPS sharing frequency. For example, if a lead vehicle is sharing GPS coordinates at a lower sharing frequency (e.g., 1 GPS coordinate per 5 seconds), an occupant of a following vehicle can request a higher sharing frequency (e.g., 1 GPS coordinate per second). On the other hand, if a lead vehicle is sharing GPS coordinates at a higher sharing frequency (e.g., 1 GPS coordinate per 1 seconds), an occupant of a following vehicle can request a lower sharing frequency (e.g., 1 GPS coordinate per two seconds). A lead vehicle can respond to a sharing frequency change request from a following vehicle by changing a sharing frequency as requested. In one aspect, a lead vehicle balances sharing frequency change requests from multiple following vehicles to accommodate following vehicles to an extent possible.

In another aspect, a GPS device at a following vehicle can (e.g., automatically and without occupant intervention) request a change (e.g., an increase or a decrease) to a GPS sharing frequency. For example, the GPS device at the following vehicle can detect it is getting tedious to calculate a route and/or follow a lead vehicle and request a decrease to GPS sharing frequency. As an alternative, a GPS device at a following vehicle can drop/ignore GPS coordinate data when GPS coordinate data is available but of limited value in calculating a route and/or following a lead vehicle. On the other hand, if a GPS sharing frequency is too low for a following GPS device to efficiently follow a lead vehicle, the GPS device can request an increase to GPS sharing frequency.

A trip may be initiated when vehicles are in different start locations. A navigation route can include traveling to a common location (e.g., an intersection) and then following a designated master GPS device to a destination.

A GPS device can maintain a destination and a preferred route from a current location to the destination independently from a shared location of the master GPS device. As such, occupants of a following vehicle know the destination and may be able to tell when a lead vehicle is lost based on coordinates of a master GPS device.

GPS devices can include input devices and output devices. In one aspect, a GPS device includes a touch screen device facilitating both input to and video output from the GPS device. A video output device can show different views of a trip, either on split screens or on the same screen. Output device views can indicate where other vehicles are on a route. Output device views can also indicate a route to a destination and a route to a location of a master GPS device in parallel. Routes can be dynamically updated as the location of the GPS device changes and/or as the location of a master GPS device changes. Updated routes to a destination and/or to a master GPS device (including turn-by-turn navigation) can be presented on screens at a video output device.

FIG. 1 illustrates an example block diagram of a computing device 100. Computing device 100 can be used to perform various procedures, such as those discussed herein. Computing device 100 can function as a server, a client, or any other computing entity. Computing device 100 can perform various communication and data transfer functions as described herein and can execute one or more application programs, such as the application programs described herein. Computing device 100 can be any of a wide variety of computing devices, such as a mobile telephone or other mobile device, a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer storage media, such as cache memory.

Memory device(s) 104 include various computer storage media, such as volatile memory (e.g., random access memory (RAM) 114) and/or nonvolatile memory (e.g., read-only memory (ROM) 116). Memory device(s) 104 may also include rewritable ROM, such as Flash memory.

Mass storage device(s) 108 include various computer storage media, such as magnetic tapes, magnetic disks, optical disks, solid state memory (e.g., Flash memory), and so forth. As depicted in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, barcode scanners, microphones, monitors or other display devices, speakers, printers, network interface cards, modems, cameras, lenses, radars, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments as well as humans. Example interface(s) 106 can include any number of different network interfaces 120, such as interfaces to personal area networks (PANs), local area networks (LANs), wide area networks (WANs), controller area networks (CANs), wireless networks (e.g., near field communication (NFC), Bluetooth, Wi-Fi, etc., networks), and the Internet. Other interfaces include user interface 118 and peripheral device interface 122.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

In general, a vehicle can be a land-based vehicle having a plurality of wheels, such as, for example, a car, a van, a truck, a motorcycle, a bus, etc. A vehicle can be autonomous or driver operated. A vehicle can include various components, such as, for example, tires, wheels, brakes, throttle, engine, etc., to facilitate operation on roadways.

Throughout this description and the following claims "GPS" is used as an acronym for "Global Positioning System."

Figure 2:
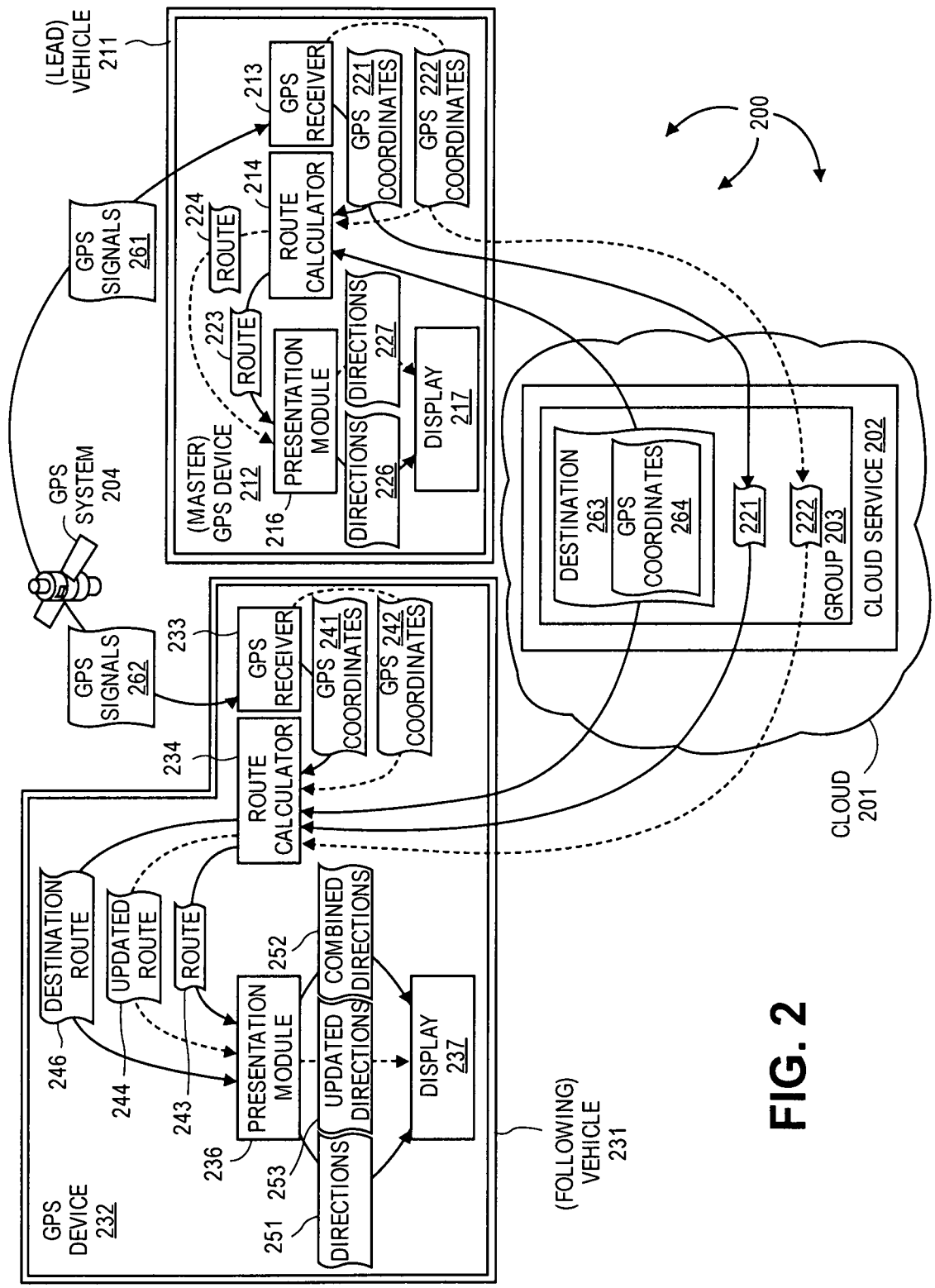
FIG. 2 illustrates an example architecture that facilitates routing following vehicles toward a lead vehicle in a vehicle caravan.

FIG. 2 illustrates an example architecture 200 that facilitates routing following vehicles toward a lead vehicle in a vehicle caravan. As depicted, architecture 200 includes cloud 201, GPS system 204, (lead) vehicle 211, and (following) vehicle 231.

GPS system 204 represents a plurality of GPS satellites that continuously transmit GPS signals indicating their current time and position. A GPS receiver can monitor multiple GPS satellites and solve equations using data from GPS signals to determine its precise location as GPS coordinates.

Cloud 201 can be a private cloud, a community cloud, a public cloud, a hybrid cloud, etc. Cloud 201 can include a shared pool of configurable computing resources (e.g., compute resources, networking resources, and storage resources) provisioned via virtualization and released with low effort or service provider interaction, and then scaled accordingly. The configurable computing resources can be configured to expose various service models, such as, for example, Software as a Service ("SaaS"), Platform as a Service ("PaaS"), and Infrastructure as a Service ("IaaS").

As depicted, cloud service 202 is running in cloud 201. Cloud service 202 permits vehicles traveling to a common destination to group with one another and share GPS coordinates. For example, group 203 can include (lead) vehicle 211, (following) vehicle 231, and possibly one or more additional following vehicles (not shown). Persons riding in (lead) vehicle 211, riding in (following) vehicle 231, and riding in any additional following vehicles can agree that (lead) vehicle 211 is to lead a trip to destination 263.

(Lead) vehicle 211 includes (master) GPS device 212 (e.g., a vehicle navigation system or a mobile phone). GPS device 212 further includes GPS receiver 213, route calculator 214, presentation module 216, and display 217. GPS device 212 can utilize integrated communication components integrated and/or communication components otherwise included at vehicle 211 (not shown) to exchange data with cloud service 202 and/or exchange data directly with other vehicles. In one aspect, the communication components are used to exchange GPS coordinates.

GPS receiver 213 can receive signals from GPS system 204 and use the received signals to determine the GPS coordinate location of GPS device 212 (and thus also the location of vehicle 211). Route calculator 214 can access GPS coordinates for a destination from group 203. Route calculator 214 can compute a route along one or more roadways to travel from a location of GPS device 212 to the destination. Route calculator 214 can compute the route from the GPS coordinates of GPS device 212 and the GPS coordinates of the destination. Route calculator 214 can refer to roadway map data (not shown) to compute the route.

Presentation module 216 can receive a route from route calculator 214. Presentation module 216 can determine turn-by-turn directions (possibly also through reference to roadway map data) for following the route along the one or more roadways. Presentation module 216 can present the turn-by-turn directions at display 217.

As vehicle 211 moves, the GPS coordinates of GPS device 212 change. Routes and turn-by-turn directions to a destination can be recomputed as the GPS coordinates of GPS device 212 change. Presentation module 216 can present updated turn-by-turn directions to the destination at display 217.

From time to time, for example, at specified intervals (e.g., defined by a GPS sharing frequency) and/or based on configuration of vehicles in group 203, GPS device 212 can also send its GPS coordinates to cloud service 202 for storage. Cloud service 202 can receive the GPS coordinates of GPS device 212 and store the GPS coordinates of GPS device 212 in cloud storage. Cloud service 202 can associate the GPS coordinates of GPS device 212 with group 203.

(Following) vehicle 231 includes GPS device 232 (e.g., a vehicle navigation system or a mobile phone). GPS device 232 further includes GPS receiver 233, route calculator 234, presentation module 236, and display 237. GPS device 233 can utilize integrated communication components and/or communication components otherwise included at vehicle 231 (not shown) to exchange data with cloud service 202 and/or exchange data directly with other vehicles. In one aspect, the communication components are used to exchange GPS coordinates.

GPS receiver 233 can receive signals from GPS system 204 and use the received signals to determine the GPS coordinate location of GPS device 232 (and thus also the location of vehicle 231). Route calculator 234 can access GPS coordinates for a destination from group 203. Route calculator 234 can compute a route along the one or more roadways to travel from a location of GPS device 232 to the destination. Route calculator 234 can compute the route from the GPS coordinates of GPS device 232 and the GPS coordinates of the destination. Route calculator 234 can refer to roadway map data (not shown) to compute the route.

Route calculator 234 can also access GPS coordinates for GPS device 212 for group 203 from cloud service 202. In one aspect, route calculator 234 GPS accesses coordinates from cloud service 202 at a GPS sharing frequency. Route calculator 234 can compute another route along the one or more roadways to travel from the location of GPS device 232 to a location of GPS device 212. Route calculator 234 can compute the other route from the GPS coordinates of GPS device 232 and the GPS coordinates GPS device 212. Route calculator 234 can refer to the roadway map data to compute other the route.

Presentation module 236 can receive a route to the destination from route calculator 234. Presentation module 236 can determine turn-by-turn directions (possibly also through reference to roadway map data) for following the route to the destination along the one or more roadways. Presentation module 236 can present the turn-by-turn directions to the destination at display 237.

Presentation module 236 can also receive the other route to GPS device 232 from route calculator 234. Presentation module 236 can determine turn-by-turn directions (possibly also through reference to roadway map data) for following the route to the location of GPS device 232 along one or more roadways. Presentation module 236 can present the turn-by-turn directions to GPS device 232 at display 237.

As vehicle 231 moves, the GPS coordinates of GPS device 232 change. Routes and turn-by-turn directions to a destination can be recomputed as the GPS coordinates of GPS device 232 change. Presentation module 236 can present updated turn-by-turn directions to the destination at display 237.

From time to time, for example, at specified intervals (e.g., defined by a GPS sharing frequency) and/or based on configuration of vehicles in group 203, route calculator 234 can access updated GPS coordinates of GPS device 212 from storage at cloud service 202. Routes and turn-by-turn directions to GPS device 212 can be recomputed as the GPS coordinates of GPS device 232 change and the GPS coordinates of GPS device 212 change. Presentation module 236 can present updated turn-by-turn directions to GPS device 212 at display 237.

In one aspect, a route to a destination and a route to GPS device 212 are presented in parallel in a split screen arrangement at display 237.

Figure 3:
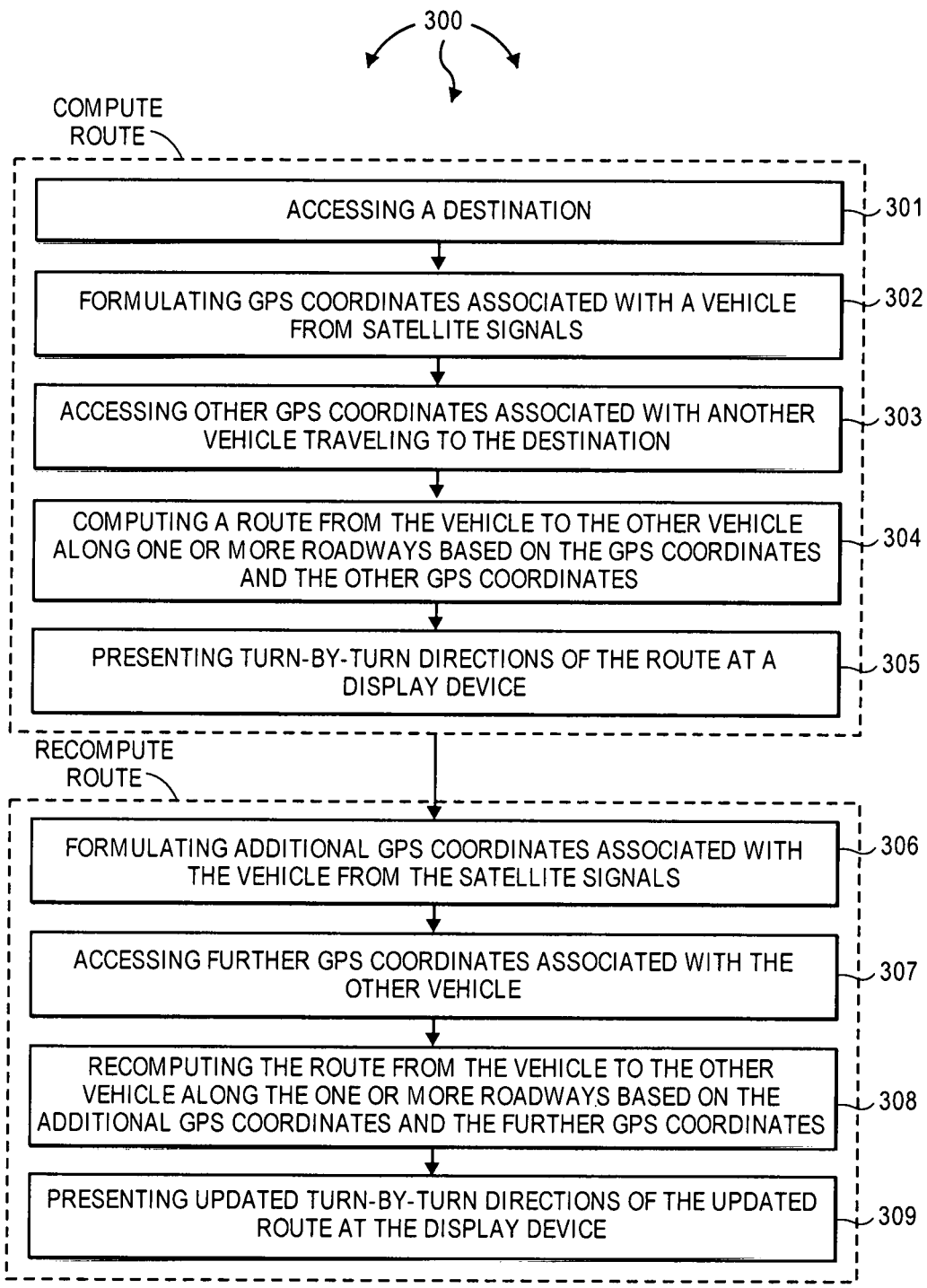
FIG. 3 illustrates a flow chart of an example method for routing following vehicles toward a lead vehicle in a vehicle caravan.

FIG. 3 illustrates a flow chart of an example method 300 for routing following vehicles toward a lead vehicle in a vehicle caravan. Method 300 will be described with respect to the components and data of architecture 200.

GPS receiver 213 can receive GPS signals 261 from GPS system 204. GPS receiver 213 can compute GPS coordinates 221 from GPS signals 261. GPS device 212 can send GPS coordinates 221 to cloud server 202 for storage in association with group 203. GPS receiver 213 can also forward GPS coordinates 221 to route calculator 214. Route calculator 214 can access GPS coordinates 264 of destination 263 from cloud service 202. Route calculator 214 can compute route 223 based on GPS coordinates 221 and GPS coordinates 264 (and possibly through reference to roadway map data). Route 223 is a route from a location of GPS device 212 to destination 263 along one or more roadways.

Route calculator can send route 223 to presentation module 216. Presentation module 216 can receive route 223 from route calculator 214. Presentation module 216 can determine turn-by-turn directions 226 (possibly also through reference to roadway map data) for following route 223 along the one or more roadways. Presentation module 216 can present the turn-by-turn directions 226 at display 217.

At vehicle 231, GPS device 232 can compute a route from GPS device 232 to GPS device 212.

Method 300 includes accessing a destination (301). For example, route calculator 214 can access GPS coordinates 264 of destination 263 from cloud service 202. Method 300 includes formulating GPS coordinates associated with a vehicle from satellite signals (302). For example, GPS receiver 233 can receive GPS signals 262 from GPS system 204. GPS receiver 233 can compute GPS coordinates 241 from GPS signals 262. Method 300 includes accessing other GPS coordinates associated with another vehicle traveling to the destination (303). For example, route calculator can access GPS coordinates 221 from cloud service 202.

Method 300 includes computing a route from the vehicle to the other vehicle along one more roadways based on the GPS coordinates and the other GPS coordinates (304). For example, route calculator 234 can calculate route 243 along one or more roadways from GPS device 232 to GPS device 212 based GPS coordinates 241 and GPS coordinates 221 (and possibly through reference to roadway map data). Route calculator 234 can send route 243 to presentation module 236.

Method 300 includes presenting turn-by-turn directions of the route at a display device (305). For example, presentation module 236 can receive route 243 from route calculator 234. Presentation module 236 can compute turn-by-turn directions 251 for route 243 (possibly through reference to roadway map data). Presentation module 236 can present turn-by-turn directions 251 at display 237.

At a later time, for example, at a specified interval or based on configuration of vehicle 211, vehicle 231, and any other following vehicles in group 203, GPS receiver 213 can compute GPS coordinates 222 from GPS signals 261. GPS device 212 can send GPS coordinates 222 to cloud server 202 for storage in association with group 203. GPS receiver can also forward GPS coordinates 222 to route calculator 214. Route calculator 214 can compute (updated) route 224 based on GPS coordinates 222 and GPS coordinates 264 (and possibly through reference to roadway map data). Route 224 is a route from a location of GPS device 212 to destination 263 along the one or more roadways.

Route calculator can send route 224 to presentation module 216. Presentation module 216 can receive route 224 from route calculator 214. Presentation module 216 can determine (updated) turn-by-turn directions 227 (possibly also through reference to roadway map data) for following route 224 along the one or more roadways. Presentation module 216 can present the turn-by-turn directions 227 at display 217.

At vehicle 231, GPS device 232 can recompute a route from GPS device 232 to GPS device 212.

Method 300 includes formulating additional GPS coordinates associated with the vehicle from satellite signals (306). For example, GPS receiver 233 can compute GPS coordinates 242 from GPS signals 262. Method 300 includes accessing further GPS coordinates associated with the vehicle (307). For example, route calculator 234 can access GPS coordinates 222 from cloud service 202.

Method 300 includes recomputing a route from the vehicle to the other vehicle along the one more roadways based on the additional GPS coordinates and the further GPS coordinates (308). For example, route calculator 234 can calculate updated route 244 along the one or more roadways from GPS device 232 to GPS device 212 based GPS coordinates 242 and GPS coordinates 222 (and possibly through reference to roadway map data). Route calculator 234 can send updated route 244 to presentation module 236.

Method 300 includes presenting updated turn-by-turn directions of the route at a display device (309). For example, presentation module 236 can receive updated route 244 from route calculator 234. Presentation module 236 can compute updated turn-by-turn directions 253 for updated route 244 (possibly through reference to roadway map data). Presentation module 236 can present updated turn-by-turn directions 253 at display 237.

If GPS device 232 is ever sufficiently far away from GPS device 212, GPS device 232 can offer a smart routing option to make progress towards GPS device 212. In one aspect, GPS device 232 proposes taking the same route as GPS device 212 (e.g., the route calculated by GPS device 232 based on continually received coordinates of GPS device 212, for example, GPS coordinates 221, GPS coordinates 22, etc. In another aspect, GPS device 232 calculates and proposes a faster and/or shorter route to GPS device 232 (potentially getting to GPS device 232 in less time than taking the same path as GPS device 212). Smart routing can be selecting while driving or routing or an occupant of vehicle 231 can pre-configure GPS 232 device with their preferences.

Depending on speed and distance to GPS device 212, an occupant in vehicle 231 can request a change to GPS sharing frequency of GPS device 212 (e.g., either an increase or a decrease in sharing frequency). The request can be sent through cloud service 202 or via V2V communication. GPS device 212 can respond to the request by changing a GPS sharing frequency as requested.

Figure 4:
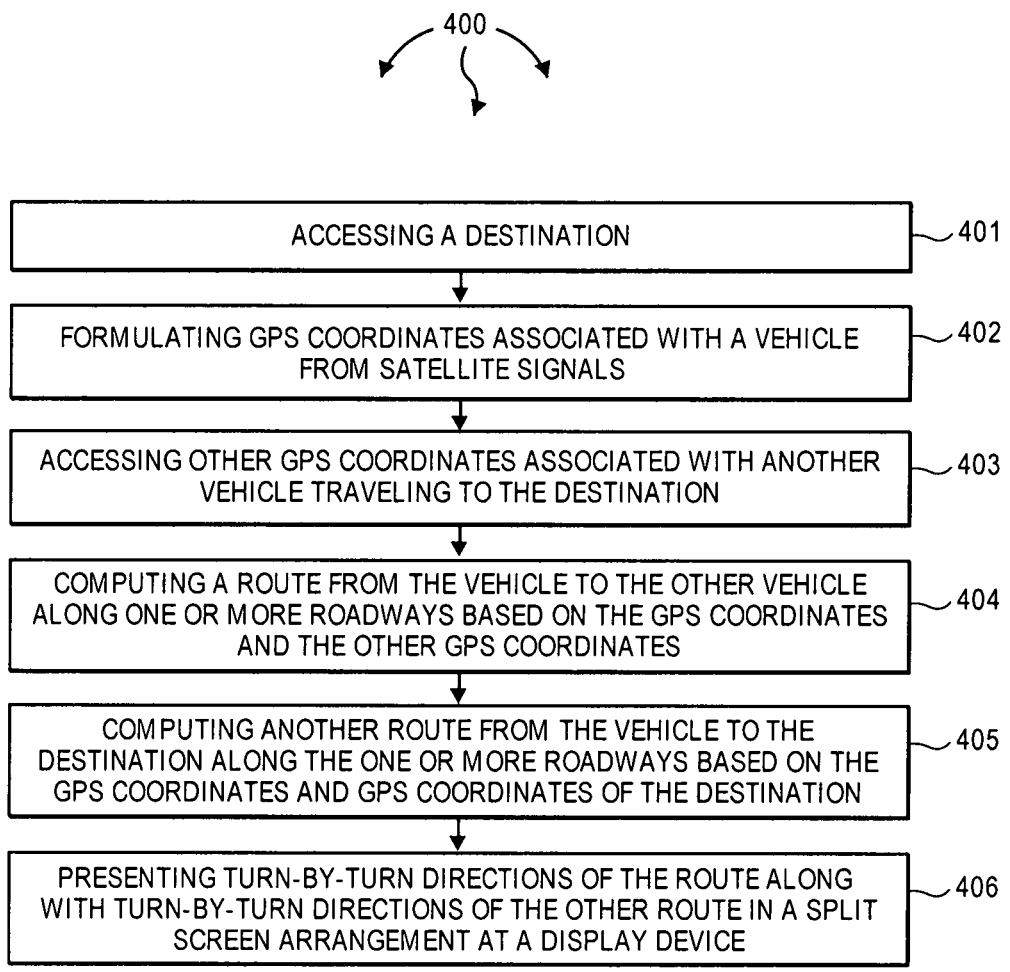
FIG. 4 illustrates a flow chart of another example method for routing following vehicles toward a lead vehicle in a vehicle caravan.

FIG. 4 illustrates a flow chart of a method 400 for routing following vehicles toward a lead vehicle in a vehicle caravan. Method 400 will be described with respect to the components and data of architecture 200.

Method 400 includes accessing a destination (401). For example, route calculator 214 can access GPS coordinates 264 of destination 263 from cloud service 202. Method 400 includes formulating GPS coordinates associated with a vehicle from satellite signals (402). For example, GPS receiver 233 can receive GPS signals 262 from GPS system 204. GPS receiver 233 can compute GPS coordinates 241 from GPS signals 262. Method 400 includes accessing other GPS coordinates associated with another vehicle travel to the destination (403). For example, route calculator can access GPS coordinates 221 from cloud service 202.

Method 400 includes computing a route from the vehicle to the other vehicle along one more roadways based on the GPS coordinates and the other GPS coordinates (404). For example, route calculator 234 can calculate route 243 along one or more roadways from GPS device 232 to GPS device 212 based GPS coordinates 241 and GPS coordinates 221 (and possibly through reference to roadway map data). Route calculator 234 can send route 243 to presentation module 236.

Method 400 includes computing another route from the vehicle to the destination along the one more roadways based on the GPS coordinates and GPS coordinates of the destination (405). For example, route calculator 234 can calculate destination route 246 along one or more roadways from GPS device 232 to destination 263 based on GPS coordinates 241 and GPS coordinates 264 (and possibly through reference to roadway map data). Route calculator 234 can send destination route 246 to presentation module 236.

Method 400 includes presenting turn-by-turn directions of the route along with turn-by-turn directions of the other route in a split screen arrangement at a display device (406). For example, presentation module 236 can formulate combined turn-by-turn directions 252 from route 243 and destination route 246. Presentation module 236 can present combined turn-by-turn directions 252 at display 237. Turn-by-turn instructions for route 243 can be presented in one part of display device 237 and turn-by-turn instructions for destination route 246 can be presented in another part of display device 237.

As GPS device 232 moves and GPS device 212 moves, route calculator 234 can recompute route 243 (e.g., into update routed 244) and/or can recompute destination route 246. Presentation module 236 can formulate updated combined turn-by-turn directions from recomputed routes and can update presentation of turn-by-turn directions at appropriate parts of display 237.

Figure 5:
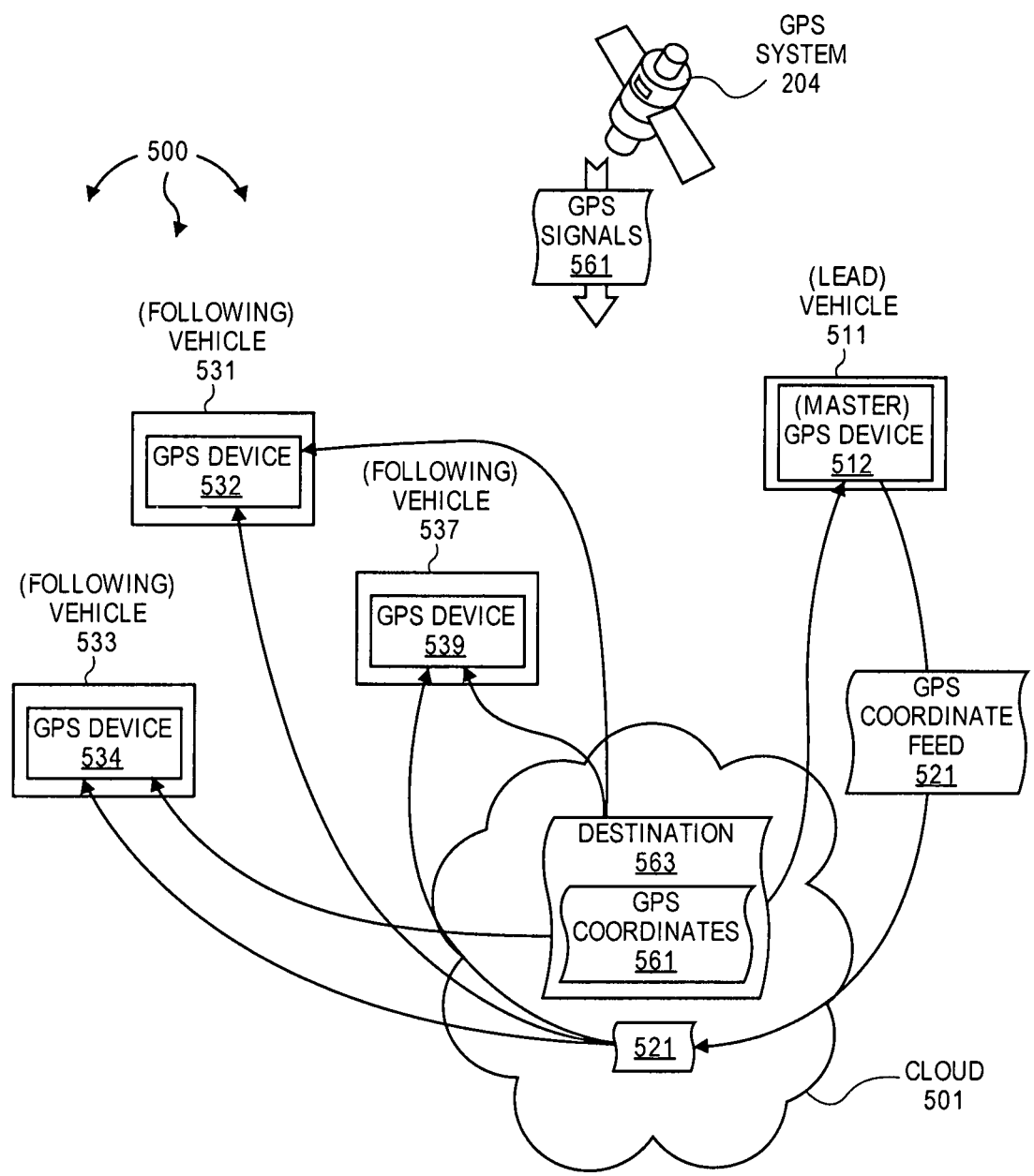
FIG. 5 illustrates another example architecture that facilitates routing following vehicles toward a lead vehicle in a vehicle caravan.

FIG. 5 illustrates an example architecture 500 that facilitates routing following vehicles toward a lead vehicle in a vehicle caravan. In general, occupants of (lead) vehicle 511 and occupants of (following) vehicles 531, 533, and 537 can form a group. The occupants can agree to have vehicle 511 lead a caravan including vehicles 531, 533, and 537 to destination 563 (at GPS coordinates 561).

Vehicle 511 and vehicles 531, 533, and 537 receive GPS signals 561 from GPS system 204. (Master) GPS device 512 can locally compute its GPS coordinates (and thus of the location of vehicle 511) from GPS signals 561. GPS device 512 can send GPS coordinate feed 521 to cloud 501 for storage. As vehicle 511 moves, GPS coordinate feed 521 can include new GPS coordinates for GPS device 512. New coordinates can be sent to cloud 501 at specified intervals (possibly at a GPS sharing frequency), for example, based on speeds of vehicle 511 and vehicles 531, 533, and 537 and distances between vehicle 511 and vehicles 531, 533, and 537.

GPS devices 532, 534, and 539 can locally compute GPS coordinates of GPS devices 532, 534, and 539 respectively. GPS devices 532, 534, and 539 can also access GPS coordinates of GPS coordinate feed 521 from storage at cloud 501 (possibly at the GPS sharing frequency). GPS devices 532, 534, and 539 can use locally computed GPS coordinates and the accessed GPS coordinates to compute and recompute routes and turn-by-turn instructions to make progress towards GPS device 512.

GPS device 512 and GPS devices 532, 534, and 539 can also compute routes to destination 563 from locally computed GPS coordinates and GPS coordinates 561.

In some aspects, GPS devices 532, 534, and 539 also share GPS coordinates through cloud 501. Other GPS devices can access shared GPS coordinates and use the shared GPS coordinates to indicate the location of GPS devices 532, 534, and 539 in turn-by-turn instructions. Thus, one following vehicle can see the location of one or more other following vehicles on a display.

In other aspects, GPS device 512 and GPS devices 532, 534, and 539 form an ad hoc network (e.g., for the group). GPS device 512 and GPS devices 532, 534, and 539 can send GPS coordinate to one another via the ad hoc network.

Figure 6:
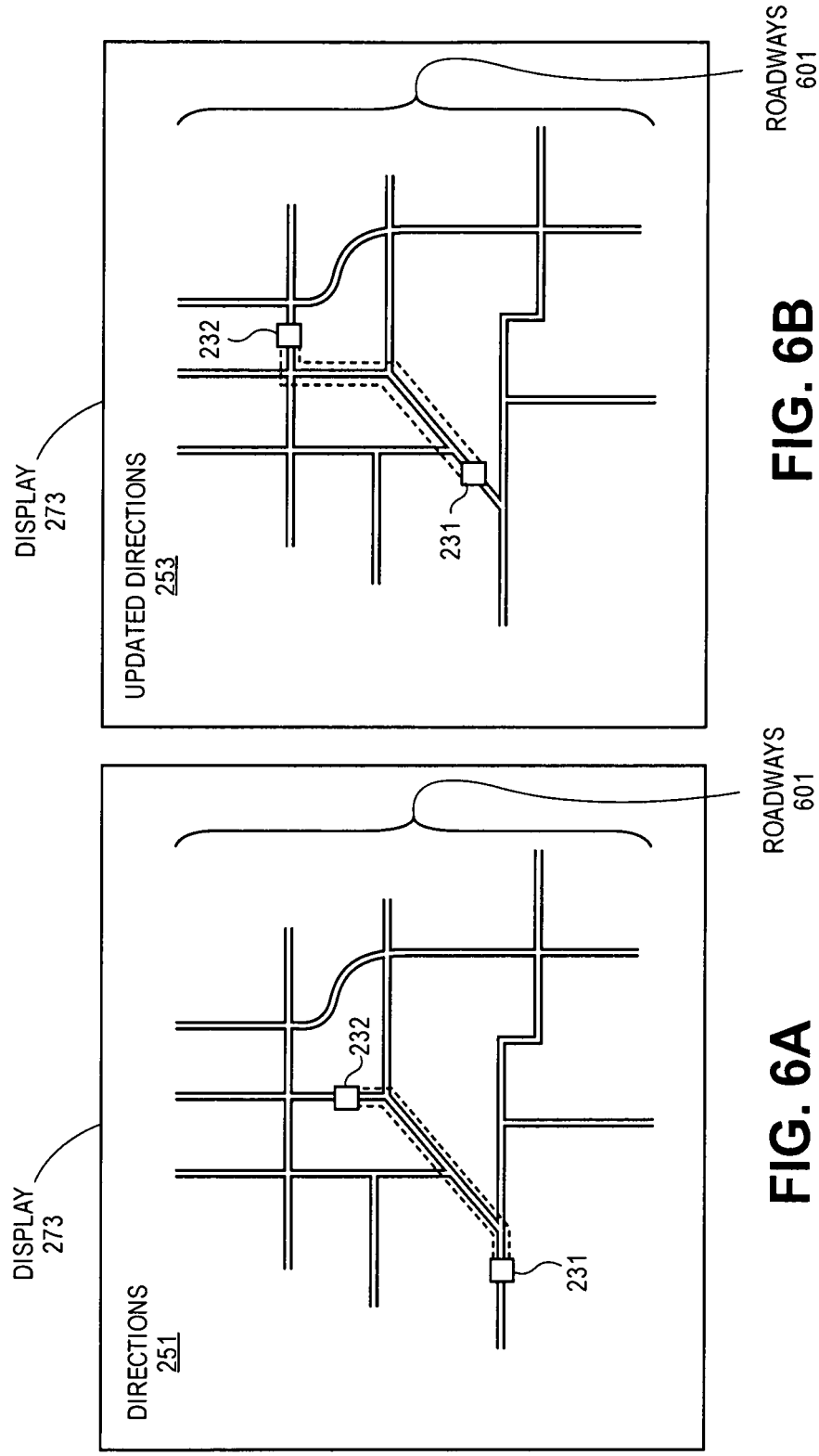
FIG. 6A illustrates an example of turn-by-turn directions from a following vehicle to a lead vehicle.
FIG. 6B illustrates an example of updated turn-by-turn directions from a following vehicle to a lead vehicle.

FIG. 6A illustrates an example of turn-by-turn directions to make progress from a following vehicle to a lead vehicle. As depicted, turn-by-turn instructions 251 are presented at display 273. Turn-by-turn instructions 251 indicate a route on roadways 601 for vehicle 231 to make progress towards vehicle 232.

FIG. 6B illustrates an example of updated turn-by-turn directions to make progress from a following vehicle to a lead vehicle. As depicted, updated turn-by-turn instructions 253 are presented at display 273. Turn-by-turn instructions 253 indicate a route on roadways 601 for vehicle 231 to make progress towards vehicle 232. Turn-by-turn instructions 253 indicate that both vehicle 231 and vehicle 232 have moved some (but possibly a different) distance since presentation of turn-by-turn instructions 251.

Figure 7:
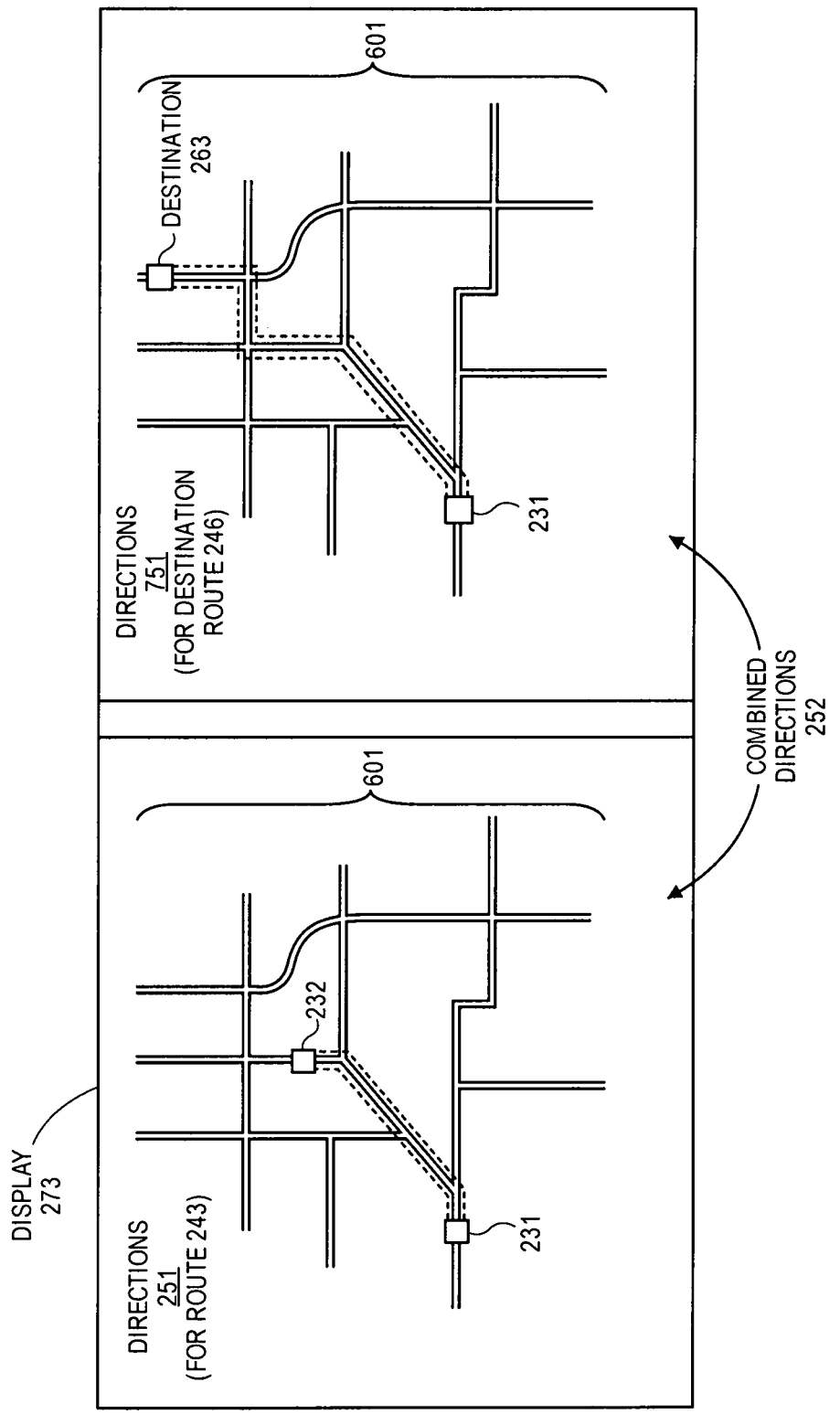
FIG. 7 illustrates an example split screen arrangement of turn-by-turn directions from a following vehicle to a lead vehicle and turn-by-turn directions from the following vehicle to a destination vehicle.

FIG. 7 illustrates an example split screen arrangement of turn-by-turn directions from a following vehicle to a lead vehicle and turn-by-turn directions from a following vehicle to a destination vehicle. As depicted, combined instructions 252 are presented at display 273. Turn-by-turn directions 251 (for route 243) are presented on one part of display 273 and turn-by-turn directions 751 (for destination route 246) are presented on another part of display 273.

Turn-by-turn instructions 251 indicate a route on roadways 601 for vehicle 231 to make progress towards vehicle 232. Turn-by-turn instructions 751 indicate a route on roadways 601 for vehicle 231 to make progress towards destination 263.

EXAMPLES

In some instances, the following examples may be implemented together or separately by the systems and methods described herein.

Example 1 may include a method, comprising: determining, by at least one processor in communication with at least one memory, first GPS coordinates of a first GPS device; receiving, by the at least one processor, second GPS coordinates of a second GPS device; determining, by the at least one processor and based on the first GPS coordinates and the second GPS coordinates, a route to travel from the first GPS device to the second GPS device along one or more roadways; and causing presentation of, by the at least one processor, turn-by-turn directions of the route at a display device.

Example 2 may include the method of example 1 and/or some other example herein, wherein receiving the second GPS coordinates of the second GPS device comprises receiving the second GPS coordinates from network-based storage.

Example 3 may include the method of example 1 and/or some other example herein, further comprising: receiving, by the at least one processor, third GPS coordinates of the second GPS device; determining, by the at least one processor and based on the first GPS coordinates and the third GPS coordinates, an updated route to travel from the first GPS device to the second GPS device along the one or more roadways; and causing presentation of, by the at least one processor, updated turn-by-turn directions of the updated route at the display device.

Example 4 may include the method of example 1 and/or some other example herein, further comprising: receiving, by the at least one processor, a destination; determining, by the at least one processor and based on the first GPS coordinates and GPS coordinates of the destination, a second route from the first GPS device to the destination along the one or more roadways; and causing presentation of, by the at least one processor, turn-by-turn directions of the second route along with the turn-by-turn directions of the route at the display device.

Example 5 may include the method of example 4 and/or some other example herein, further comprising associating, by the at least one processor, the first GPS device to a group of GPS devices attempting to reach the destination, the group of GPS devices including the second GPS device and a third GPS device.

Example 6 may include the method of example 5 and/or some other example herein, further comprising causing presentation of, by the at least one processor, a location of the third GPS device at the display device.

Example 7 may include a method, comprising: receiving, by at least one processor in communication with at least one memory, a destination; determining, by the at least one processor, GPS coordinates associated with the vehicle from satellite signals; receiving, by the at least one processor, other GPS coordinates associated with another vehicle traveling to the destination; determining, by the at least one processor based on the GPS coordinates and the other GPS coordinates, a route from the vehicle to the other vehicle along one or more roadways; and generating, by the at least one processor, turn-by-turn directions of the route for presentation at a display device.

Example 8 may include the method of example 7 and/or some other example herein, wherein determining GPS coordinates associated with the vehicle comprises determining GPS coordinates at a GPS device moving with the vehicle.

Example 9 may include the method of example 8 and/or some other example herein, wherein receiving other GPS coordinates associated with another vehicle traveling to the destination comprises receiving GPS coordinates of a master GPS device from cloud based storage.

Example 10 may include the method of example 9 and/or some other example herein, further comprising associating, by the at least one processor, the GPS device to a group of GPS devices attempting to reach the destination, the group of GPS devices including the master GPS device and one or more additional GPS devices.

Example 11 may include the method of example 10 and/or some other example herein, further comprising: receiving, by the at least one processor, additional GPS coordinates for each of the one or more additional GPS devices from the cloud base storage; and generating, by the at least one processor and based on the additional GPS coordinates, the locations of each GPS device included in the group of GPS devices for presentation at the display device.

Example 12 may include the method of example 7 and/or some other example herein, further comprising: receiving, by the at least one processor, further GPS coordinates associated with the other vehicle; determining, by the at least one processor and based on the GPS coordinates and the further GPS coordinates, the route from the vehicle to the other vehicle along the one or more roadways; and generating, by the at least one processor, updated turn-by-turn directions of the updated route for display at the display device.

Example 13 may include the method of example 7 and/or some other example herein, further comprising: determining, by the at least one processor and based on the GPS coordinates and GPS coordinates of the destination, another route from the vehicle to the destination along the one or more roadways; and generating, by the at least one processor, turn-by-turn directions of the other route for presentation at the display device along with the turn-by-turn directions of the route.

Example 14 may include a vehicle, comprising: a GPS device; a display device; a memory storing computer-executable instructions; and one or more processors coupled to the memory and configured to execute the computer-executable instructions to: assoc the GPS device to a group of GPS devices at other vehicles traveling to a destination, the group of GPS devices including a master GPS device associated with another vehicle, other GPS devices in the group of GPS devices following the master GPS device to the destination; determine GPS coordinates of the GPS device from satellite signals; receive other GPS coordinates of the master GPS device; determine a route from the vehicle to the other vehicle along one or more roadways based on the GPS coordinates and the other GPS coordinates; and cause the presentation of turn-by-turn directions of the route at the display device.

Example 15 may include the vehicle of example 14 and/or some other example herein, further comprising instructions configured to cause the one or more processors to: receive additional GPS coordinates for one or more additional GPS devices included in the group of GPS devices from the cloud base storage; and cause the presentation of the locations of each GPS device included in the group of GPS devices at the display device based on the additional GPS coordinates.

Example 16 may include the vehicle of example 14 and/or some other example herein, further comprising instructions configured to cause the one or more processors to: receive further GPS coordinates of the master GPS device; determine the route from the vehicle to the other vehicle along the one or more roadways based on the GPS coordinates and the further GPS coordinates; and cause the presentation of updated turn-by-turn directions of the updated route at the display device.

Example 17 may include the vehicle of example 14 and/or some other example herein, further comprising instructions configured to cause the one or more processors to: determine another route from the vehicle to the destination along the one or more roadways based on the GPS coordinates and GPS coordinates of the destination; and cause the presentation of turn-by-turn directions of the other route at the display device along with the turn-by-turn directions of the route.

Example 18 may include the vehicle of example 14 and/or some other example herein, further comprising instructions configured to cause the one or more processors to determine another route from the vehicle to the destination along the one or more roadways based on the GPS coordinates and GPS coordinates of the destination.

Example 19 may include the vehicle of example 18 and/or some other example herein, wherein instructions configured to cause the one or more processors to cause the presentation of turn-by-turn directions of the route at the display device comprise instructions configured to cause the processor to cause presentation of turn-by-turn directions of the route along with turn-by-turn directions of the other route at the display device.

Example 20 may include the vehicle of example 18 and/or some other example herein, wherein instructions configured to cause the one or more processors to receive other GPS coordinates of the master GPS device comprise instructions configured to cause the processor to receive the other GPS coordinates via Vehicle-to-Vehicle (V2V) between the vehicle the other vehicle.

In one aspect, one or more processors are configured to execute instructions (e.g., computer-readable instructions, computer-executable instructions, etc.) to perform any of a plurality of described operations. The one or more processors can access information from system memory and/or store information in system memory. The one or more processors can transform information between different formats, such as, for example, GPS signals, GPS coordinates, destinations, routes, turn-by-turn directions, etc.

System memory can be coupled to the one or more processors and can store instructions (e.g., computer-readable instructions, computer-executable instructions, etc.) executed by the one or more processors. The system memory can also be configured to store any of a plurality of other types of data generated by the described components, such as, for example, GPS signals, GPS coordinates, destinations, routes, turn-by-turn directions, etc.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash or other vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications, variations, and combinations are possible in light of the above teaching. Further, it should be noted that any or all of the aforementioned alternate implementations may be used in any combination desired to form additional hybrid implementations of the disclosure.

What is claimed:

1. A method, comprising:
   receiving, by a first GPS device of a follower vehicle, from a GPS satellite system, first GPS coordinates of a first location of the follower vehicle;
   receiving, by a route calculator of the follower vehicle, second GPS coordinates of a second location of a lead vehicle; and
   determining, by the route calculator of the follower vehicle, and based at least in part on the first GPS coordinates and the second GPS coordinates, a route for the follower vehicle to travel towards the lead vehicle.

2. The method of claim 1, further comprising:
   receiving, by the route calculator of the follower vehicle, third GPS coordinates of a third location of the lead vehicle;
   determining, by the route calculator of the follower vehicle, and based at least in part on the first GPS coordinates and the third GPS coordinates, an updated route for the follower vehicle to travel towards the lead vehicle.

3. The method of claim 1, further comprising:
   receiving, by the route calculator of the follower vehicle, third GPS coordinates of a destination;
   determining, by the route calculator of the follower vehicle, and based at least in part on the first GPS coordinates and third GPS coordinates of the destination, an updated route for the follower vehicle to travel to the destination.

4. The method of claim 3, further comprising a route calculator of the lead vehicle sharing the first GPS coordinates with a route calculator of at least one other follower vehicle.

5. The method of claim 1, further comprising:
   receiving, in a presentation module of the follower vehicle, a route from the route calculator; and
   displaying, by the presentation module, in a display device, turn-by-turn instructions for the follower vehicle to follow the route.

6. A method, comprising:
   receiving, by a route calculator of a follower vehicle, first GPS coordinates of a destination;
   receiving, by the route calculator of the follower vehicle, second GPS coordinates associated with a lead vehicle traveling to the destination;
   determining, by the route calculator of the follower vehicle, based at least in part on the first GPS coordinates and the second GPS coordinates, a first route for the follower vehicle to travel to the destination and a second route to travel towards the lead vehicle; and
   displaying, in a split-screen display device, first turn-by-turn instructions for the follower vehicle to travel to the destination and second turn-by-turn instructions for the follower vehicle to travel towards the lead vehicle.

7. The method of claim 6, wherein receiving by the route calculator of the follower vehicle, the first GPS coordinates and the second GPS coordinates comprises receiving at least one of the first GPS coordinates or the second GPS coordinates from cloud based storage.

8. The method of claim 6, further comprising a route calculator of the lead vehicle sharing the first GPS coordinates with a route calculator of at least one other follower vehicle.

9. The method of claim 6, further comprising:
receiving, by the route calculator of the follower vehicle, additional GPS coordinates for at least one other follower vehicle; and
determining, by the route calculator, a location of the one other follower vehicle based on the additional GPS coordinates.

10. The method of claim 6, further comprising:
receiving, by the route calculator of the follower vehicle, third GPS coordinates associated with one other follower vehicle; and
determining, by the route calculator of the follower vehicle, based at least in part on the third GPS coordinates, a route for the follower vehicle to travel towards the one other vehicle.

11. The method of claim 6, further comprising:
determining, by the route calculator of the follower vehicle, based at least in part on the first GPS coordinates and the second GPS coordinates an alternative route from the follower vehicle to the destination.

12. A vehicle, comprising:
a GPS device;
a display device;
a memory storing computer-executable instructions; and
one or more processors coupled to the memory and configured to execute the computer-executable instructions to:
associate the GPS device to a group of GPS devices at other vehicles traveling to a destination, the group of GPS devices including a master GPS device associated with a lead vehicle, other GPS devices in the group of GPS devices following the master GPS device to the destination;
determine first GPS coordinates of the GPS device from satellite signals;
receive second GPS coordinates of the master GPS device;
determine a first route to the lead vehicle, based on at least the first GPS coordinates and the second GPS coordinates; and
display turn-by-turn directions of the first route at the display device.

13. The vehicle of claim 12, further comprising instructions configured to cause the one or more processors to:
receive, from cloud storage, additional GPS coordinates for one or more additional GPS devices included in the group of GPS devices; and
display on the display device, the locations of each GPS device included in the group of GPS devices, based on the additional GPS coordinates.

14. The vehicle of claim 12, further comprising instructions configured to cause the one or more processors to:
receive further GPS coordinates of the master GPS device;
determine an updated route to the lead vehicle based at least in part on the first GPS coordinates and the further GPS coordinates; and
present updated turn-by-turn directions of the updated route at the display device.

15. The vehicle of claim 12, further comprising instructions configured to cause the one or more processors to:
determine a second route to the destination based on the first GPS coordinates and third GPS coordinates of the destination; and
present turn-by-turn directions of the second route at the display device.

16. The vehicle of claim 15, further comprising instructions configured to cause the processor to present turn-by-turn directions of the first route along with turn-by-turn directions of the second route at the display device.

17. The vehicle of claim 15, wherein instructions configured to cause the one or more processors to receive second GPS coordinates of the master GPS device comprise instructions configured to cause the processor to receive the second GPS coordinates via Vehicle-to-Vehicle (V2V) between the vehicle and the lead vehicle.

* * * * *